March 24, 1953  F. W. SIDE  2,632,791

VIBRATORY CONDENSER CONVERTER

Filed Nov. 30, 1949

*INVENTOR.*
FREDERICK W. SIDE

BY Arthur H. Swanson

ATTORNEY.

Patented Mar. 24, 1953

2,632,791

UNITED STATES PATENT OFFICE 2,632,791

VIBRATORY CONDENSER CONVERTER

Frederick W. Side, Philadelphia, Pa., assignor to Minneapolis-Honeywell Regulator Company, Minneapolis, Minn., a corporation of Delaware Application November 30, 1949, Serial No. 130,316

12 Claims. (Cl. 175—41.5)

The general object of the present invention is to provide an improved vibratory condenser converter for use in converting a minute unidirectional voltage or current into alternating voltage or current preparatory to its amplification. The invention was primarily devised and is well adapted for use in measuring small unidirectional currents such, for example, as the output currents of ionization chambers and hydrogen cells. The invention may be used, for example, in the measurement of a unidirectional current as small as $10^{-16}$ amperes.

In measuring small unidirectional voltages and currents such as those produced by a thermocouple, extensive use is now being made of apparatus for converting the unidirectional voltage or current to be measured into an alternating current signal, and for amplifying the alternating current signal developed in electronic amplifying apparatus, thereby to develop a current proportional to the original unidirectional current, and large enough to be measured by ordinary electrical measuring instruments such as a millivoltmeter. The purpose of converting the minute unidirectional current into an alternating current signal is to permit the signal to be amplified by available alternating current amplifiers having a desirable stability not possessed by direct current amplifying apparatus. Direct current amplifiers amplifying minute unidirectional currents are subject to drift to an extent great enough to create substantial measurement errors, and the drift is of a more or less unpredictable character and accurate compensation, therefore, is not practically feasible.

In the above mentioned measuring apparatus now in general use, the conversion of the unidirectional current into alternating current is effected by means of a vibrating contact mechanism which makes and breaks electric circuits at a predetermined frequency such as 60 cycles per second. Such a vibrating mechanism cannot be used in measuring the very small unidirectional voltages and currents which the present invention was devised and is adapted to measure because the contact resistance of the vibrator mechanism is high enough to prevent the contacts from passing currents as small as those to be measured.

The difficulties due to vibrator contact resistance are not experienced in the use of vibrating condenser converters. In the operation of such a converter, the unidirectional current to be measured is caused to put a charge on a condenser comprising relatively movable plates, and vibrating mechanism moves one condenser plate toward and away from the other with a suitable alternating current frequency, which may well be 60 cycles per second in some cases, and may be higher in other cases. Because of the minute character of the voltages and currents to be converted in the intended use of the invention, it is practically essential that the distance between the condenser plates should be extremely small and that the plates should be accurately formed and proportioned and maintained in proper relative positions.

A practically important object of the invention is to provide means for supporting and vibrating the movable plate of the condenser converter, so that said plate will be given the proper extent of vibratory movement without risk of over-travel causing the movable condenser plate to engage the stationary condenser plate. A further object of the invention is to provide a condenser converter having a desirably large voltage amplitude characteristic, and including effective shielding provisions. A further object of the invention is to provide a condenser converter which has the previously mentioned desirable operating characteristics, and is adapted to develop an alternating current sinusoidal wave form almost wholly free from harmonic disturbance. Another specific object of the invention is to provide a converter in which the combination electromagnetic and electrostatic pick-up of stray signals in the condenser converter is desirably minute.

The various features of novelty which characterize my invention are pointed out with particularity in the claims annexed to and forming a part of this specification. For a better understanding of the invention, however, its advantages, and specific objects attained with its use, reference should be had to the accompanying drawings and descriptive matter in which I have illustrated and described preferred embodiments of the invention.

Figure 1:
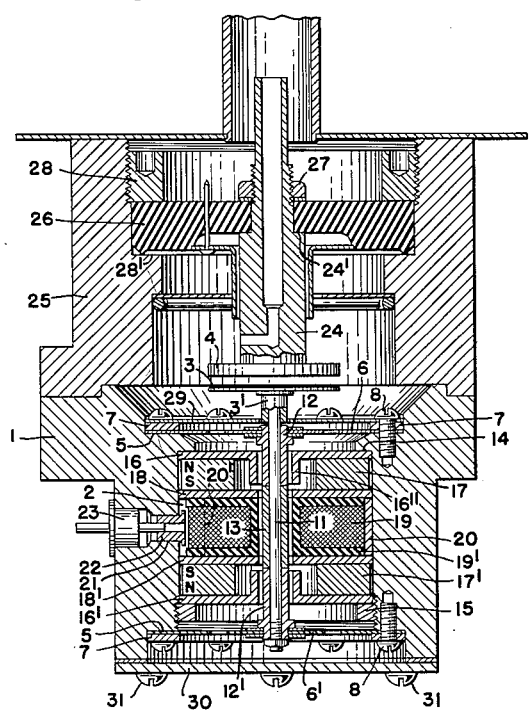
Fig. 1 is a sectional elevation through a condenser converter.
Figure 2:
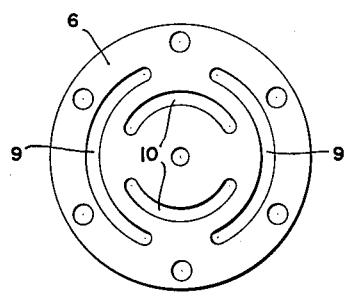
Fig. 2 is a plan view of one of the vibrating diaphragms shown in Fig. 1.

The condenser converter shown in Fig. 1 comprises a hollow metallic housing body 1 formed of non-magnetic metal such as brass, and formed with a central cylindrical chamber 2, housing the mechanism for supporting and moving the movable condenser plate, or "anvil," 3, toward and away from the stationary condenser plate 4. The condenser plates may well be formed of steel or of brass which is nickel plated, and have their adjacent sides smooth and parallel. Advantageously, the steel or nickel plated plates are plated with gold, or with rhodium, as described and claimed in the application of Harry Reese, Serial No. 130,285, filed concurrently herewith, and are then burnished and cleaned. As shown, the central chamber 2 is enlarged at each end to provide an annular seat 5 adjacent each end of the housing body against which the peripheral portion of a corresponding resilient diaphragm or spider element 6 or 6' is clamped by means of a clamping ring 7, and clamping bolts 8 screwed into threaded holes surrounding and parallel to the axis of the chamber 2. The two diaphragms or spider elements may be similar in construction and form except that as is hereinafter explained, the diaphragm 6 adjacent the anvil 3 is preferably substantially thicker and stiffer than the diaphragm 6' more remote from the anvil 3. As shown in Fig. 2, the diaphragm 6 is formed with an outer pair of arc-shaped slots 9 symmetrically disposed at opposite sides of the center point of the diaphragm, and having their concave sides facing one another. As shown, each diaphragm 6 is also formed with two other arc-shaped slots 10, similar in form and arrangement to the slots 9, but collectively displaced 90° relative thereto. The diaphragm 6 may well be about ten thousandths of an inch thick, and formed of spring bronze or beryllium copper. The diaphragm 6' may be slotted like the diaphragm 6 and formed of the same material, but may be about a third as thick or less.

The diaphragms 6 and 6' are mechanically connected to and support a brass shaft 11, which extends through the diaphragms, and carries clamping means adjacent each of its ends by which the central portion of the corresponding diaphragm is rigidly secured to the shaft. The shaft 11 may well be vertical as shown, and has its upper end extending into, and rigidly secured in a hollow boss 3' at the under side of, and integrally connected to, the movable condenser plate or anvil member 3. The portion of the shaft 11 between its diaphragm supports is surrounded by two tubular spacers 12 and 12' respectively adjacent the diaphragm 6 and 6', and is surrounded and rigidly clamped to a tubular armature 13 interposed between, and having its ends abutting against the ends of the spacers 12 and 12'. The armature 13 is formed of soft iron suitable for use as armature material, such as Armco iron, and may well be cadmium plated.

The mechanism housed in the chamber 2 comprises a plurality of annular elements clamped between an upper annular shoulder portion 14 of the housing 1, and lower clamping ring 15 in threaded engagement with the lower portion of the peripheral wall of the chamber 2. The elements clamped between the shoulder 14 and clamping ring 15 comprise a magnetic flux conductor 16, a permanent magnet 17, a lamination 18, a coil 19 and its supporting spool 19', an arc-shaped lamination 20, a lamination 18', a permanent magnet 17', and a flux conductor 16'. The elements just named are arranged in the order stated between the shoulder 14 and clamping ring 15. The parts 16' 17', and 18' are duplicates of the parts 16, 17, and 18, respectively. The flux conductor 16 is a steel disc with a central aperture and a depending hub surrounding and spaced away from the periphery of the spacer 12. The permanent magnet 17 is an annulus and the polarity of its upper end is the same as the polarity of the lower end of the magnet 17'. As indicated, the upper end of the magnet 17 is a north pole and its lower end is a south pole, and the upper and lower ends of the magnet 17' are south and north poles, respectively.

The laminations 18 and 18' are steel discs loosely surrounding the armature 13 and preferably are cadmium plated. The coil 19 is of annular form and fits snugly on the hub portion and between the sides of the flanges of the coil support 19'. The lamination 20 is in the form of a strip of steel, bent into a circular arc of about 300° extent which surrounds the coil support 19' and acts as a strut between the laminations 18 and 18' and also serves to close a magnetic path between the laminations 18 and 18'. The ends of the arc-shaped lamination 20 terminate at opposite sides of a coil terminal bushing element 22 mounted in a radial passage 21 in the cylindrical housing body wall. One end 20' of the lamination 20 is shown in dotted lines in Fig. 1. The outer portion of the passage 21 is enlarged to removably receive a circuit connector element 23 detachably connected to the element 22.

The condenser plate 4 is attached to the lower end of a metallic body 24 which is supported in and insulated from a housing body 25 which is above, and mounted on and connected to the housing body 1. As shown, the member 24 extends through an annular support 26 of insulating material to which the member 24 is rigidly attached by means of a collar 27 threaded on a reduced upper portion of member 24 and engaging the upper side of the member 26, and a shoulder portion 24' of the member 24, which engages the lower surface of the member 26. The under side of the rim portion of the member 26 rests on a shoulder 28' of the housing member 25 and the upper end of the rim portion of the member 26 is engaged by a clamping ring 28. The latter is externally threaded and screwed into an internally threaded portion of the housing body 25.

The space above the diaphragm 6 is substantially closed by a magnetic shield disc 29 of steel secured in place by the clamping screws 8 employed to clamp the rim of said diaphragm 6 in place. The disc 29 is formed with a small central aperture loosely receiving the hub portion 3' of the plate 3. As shown, the lower end of the chamber 2 is closed by a steel cover plate 30 secured to the lower end of the housing body 1 by screws 31.

The embodiment of the invention shown in Fig. 1 illustrates a vibratory condenser converter, now in successful use, in which the condenser plates 3 and 4 are each approximately an inch in diameter, are formed of steel, and are plated with rhodium or gold. In said converter, the plate 3 is slightly less than four hundredths of an inch thick, and the thickness of the plate 4 is slightly less than one tenth of an inch. In the normal operation of said converter, the distance between the adjacent sides of the two plates varies during each alternating current cycle between a minimum of about .002" and a maximum of about .04". The movable condenser plate 3 and the movable parts attached thereto form a light weight vibrating element which is supported by the diaphragms or spiders 6 and 6' without significant deflection of the latter from the planes of their peripheral portions when the plate 3 is not being vibrated. In consequence, when the plate is being vibrated, each diaphragm deflects alternately in opposite directions from the plane including its peripheral portion. Thus, in operation, the plate 3 moves alternately in opposite directions from a neutral or normal plane.

The armature 13 has its upper end continuously within the relatively strong magnetic field created and directed by the permanent magnet 17, flux conductor 16, and lamination 18, and has its lower end continuously within the relatively strong magnetic field created by the permanent magnet 17' and the associated flux conductor 16' and lamination 18'. The armature 13 is reversibly polarized during each full cycle of the alternating current energizing the coil 19, so that during one half of each cycle, the upper end of the armature is a magnetic north pole and its lower end is a south pole; while during the other half cycle, the upper end is a south pole and the lower end is a north pole. The two ends of the armature 13 are simultaneously subjected to lifting magnetic forces during each half cycle period in which the upper end of the armature 13 is a south magnetic pole, and are simultaneously subjected to lowering magnetic forces during each half cycle period in which the upper end of the armature 15 is a north pole. The electromagnetic forces act in the same direction at the same time on each end of the armature 13, as a result of the fact that the annular permanent magnets 17 and 17' have poles at their adjacent ends which are of the same polarity. As indicated by the letters "N" and "S" in Fig. 1, the south pole of the annular permanent magnet 17 is its lower end, and the south pole of the lower magnet 17' is at the upper end of the latter.

With the plates 3 and 4 and the supporting spiders 6 and 6' for the plate 3 all parallel, the plate 3 can be vibrated with a very small minimum space between the two plates, without risk of engagement with the plate 4. The air or other gas in the space between the plates 3 and 4 serves as an efficient damping agent to slow down and arrest the movement of the plate 3 as it reaches its position of minimum separation from the plate 4. As shown, the upper end of the housing body 1 is shaped to provide a substantial air space beneath and surrounding the vibrating plate 3, so that the atmosphere enveloping the condenser plates has little damping effect on the movements of the plate 3 other than the above described damping effect as the plate 3 approaches the limit of its movement toward the plate 4. The space within the housing elements 1 and 25, in which plates 3 and 4 are disposed, is enclosed, and may be filled with an inert gas such as argon. Tests indicate, however, that no real advantage is obtainable by enveloping the plates in an atmosphere of some special gas instead of air. The proper plating of the condenser plates is effected somewhat more easily and inexpensively when the plating material is rhodium than when it is gold, and the condenser contact potential variation or drift has been found to be smaller when the condenser plates are plated with rhodium than when they are plated with gold.

In practice, the apparatus is so proportioned and arranged that the natural vibration frequency of the vibrating structure is substantially different from the frequency of the alternating current energizing the coil 19. Thus, if the last mentioned frequency is 60 cycles per second, the natural vibration frequency may well be 80 cycles per second. Such frequency difference is advantageous in that it makes the effect of small changes in the frequency of the alternating current on the amplitude of the vibration of the vibrating structure much smaller than it would be if the natural frequency of the structure and the frequency of current alternation were approximately equal.

The purpose of making the diaphragm 6 thicker and stiffer than the diaphragm 6' is to make it possible for the vibration of the vibrating structure to be controlled substantially entirely by one only of the two diaphragms. This avoids risks of vibration instability and variations in vibration frequency which might develop if the vibration frequency were jointly controlled by the two diaphragms, and their natural vibration frequency became non-synchronous, or if for any reason the vibratory movements of the two diaphragms become out of phase. It is essential that the diaphragm adjacent the anvil 3 be the relatively stiff diaphragm. The other diaphragm has no real purpose other than to assist in preventing movement of the vibrating structure in a direction transverse to the axis of the structure. In effect, the stiff diaphragm 6 dominates the natural mechanical period of vibration of the vibrating structure including the condenser plate 3.

The apparatus shown in Fig. 1 has very effective shielding provisions. In a commercial embodiment of apparatus of the type and form shown in Fig. 1, the combined electromagnetic and electrostatic pick-up or stray signal in the apparatus has a value of less than five microvolts in operation when the coil exciting, alternating current voltage is two volts. The electromagnetic shielding provided is effective substantially to confine the pulsating magnetic flux produced by the coil 19 to the low reactance magnetic flux path formed by the iron surrounding the coil. When needed, electrostatic shielding can be provided by covering the coil 19 with tin foil and grounding the foil, or by placing thin copper or tin foil plates at each side of the coil and grounding those plates. As will be understood, insulation should be placed between such shields and the adjacent metal surfaces.

In the form shown, the vibrating structure operates from a neutral plane; i. e., the vibrating forces to which said structure is subjected tend to move the structure back and forth through the neutral or central position which the structure assumes when subjected to no magnetic forces tending to move the structure in any direction. As a result of variations in the strength of the magnet or in the commercial tolerances allowed in respect to the thickness of the diaphragms or the like, or because of variations in the ampere turns in the coil 19, provisions may be needed for regulating the amplitude of vibration. When such regulation is needed, it may be obtained by locating the converter in a controlled A. C. field thereby to reduce the magnetic vibrating forces, or, and preferably, the strength of the energizing current passing through the winding 19 which may be regulated by permanently connecting an external rheostat in series with said winding.

The vibrating mechanism of my novel vibrating condenser converter may take different forms. Thus, as is shown by way of example in Fig. 3, the vibrating mechanism may be formed as an operative mechanical unit, separate from the housing structure in which it may be mounted. The unit shown in Fig. 3 comprises a permanent magnet $a$ in the form of a hollow sleeve or annulus with north and south pole pieces $b$ and $b'$ secured to the north and south pole ends of the magnet.

Figure 3A:
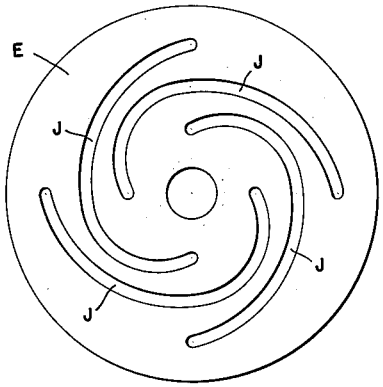
Fig. 3A is a plan view of a preferred form of vibrating diaphragm utilized in the condenser unit of Fig. 3.

The pole pieces $b$ and $b'$ are shown as discs of the same outside diameter as the magnet $a$, but having a substantially smaller internal diameter. The magnet $a$ and its pole pieces $b$ and $b'$ enclose and support an electromagnetic winding or coil $c$ which may be, and, as shown, is mounted on a spool like the spool 19' of Fig. 1. A tubular soft iron armature D is axially disposed in the space surrounded by the coil $c$ and pole pieces $b$ and $b'$. An externally threaded shaft G extends through the armature D and is supported by transverse diaphragms E and E'; which preferably are like the diaphragm shown in Fig. 3A. As illustrated in Fig. 3A, the diaphragm E is formed with a plurality of slots J of spiral configuration disposed at opposite sides of the central opening of the diaphragm, which slots have their concave sides facing one another. With this arrangement, the relationship between change in applied force to the diaphragm and the resulting deflection is linear over a substantial range of deflection. In consequence, the motion of the movable condenser plate or anvil plate F follows more closely the sinusoidal or other wave form of the alternating energizing voltage applied to the coil $c$, minimizing distortion.

The diaphragm E has a detachable hub portion $e$ clamped against the side of the diaphragm adjacent the armature. The hub $e$ is rigidly attached to the integral hub portion $f$ of the associated vibrating condenser plate F. The hub $e$ is formed with an internally threaded opening into which the adjacent end of the shaft G is screwed.

The peripheral portion of the diaphragm E is clamped between a pair of clamping rings H secured to a peripheral portion of the pole piece $b$. Similarly, the peripheral edge of the diaphragm E' is clamped between a pair of clamping rings H' attached to a peripheral portion of the pole piece $b'$. By clamping the diaphragm E and E' to their associated rings, as described, no distorting forces are applied to the diaphragms as may be introduced in the arrangement of Fig. 1 where screws 8 are employed in mounting the diaphragms. The diaphragm E' has a central hub portion $e'$ which abuts directly against the adjacent end of the armature D. A lock nut I threaded on the end of the shaft G clamps the central portion of the diaphragm E' against the end of the armature D. Diaphragms E and E' differ from one another in thickness, as do the diaphragms 6 and 6'.

Figure 3:
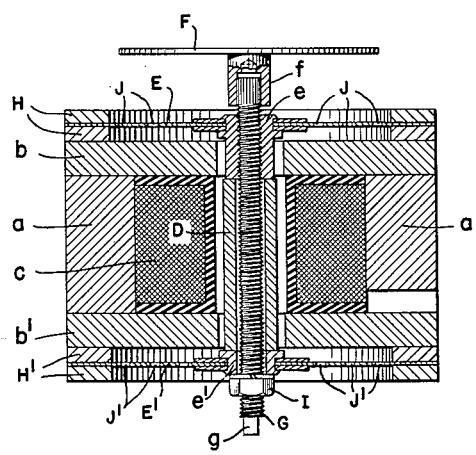
Fig. 3 is a section through a vibrating condenser unit differing from the apparatus shown in Fig. 1.

For the purpose of facilitating the attainment of the normal position of the movable condenser plate or anvil F with respect to its associated stationary condenser plate, not shown in Fig. 3, but which may correspond to the condenser plate 4 of Fig. 1, the externally threaded shaft G may be adjusted longitudinally of the internally threaded hub $e$ by loosening the lock nut I and rotating the shaft. To this end, a flat projection $g$ which may readily be grasped is provided on the lower end of the shaft G. When the anvil F has been adjusted to the desired position, the lock nut I should be tightened. The longitudinal adjustment of the shaft G has the practical effect of adjusting the path of vibratory movement of the anvil F toward or away from the pole piece $b$, and therefore away from or toward the associated stationary condenser plate (not shown).

It is contemplated that similar provisions may be made in Fig. 1 for adjusting the normal position of the movable condenser plate 3 with respect to the stationary plate 4. The construction shown in Fig. 3 is a rugged, dependable and relatively inexpensive unit.

Figure 4:
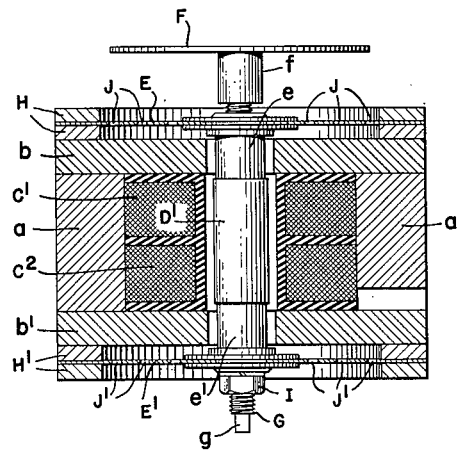
Fig. 4 is a similar view illustrating a modification of the unit shown in Fig. 3.

Fig. 4 illustrates a vibrating mechanism unit like that shown in Fig. 3 in that it is formed as an operative mechanical unit separate from and independent of the housing in which it may be mounted. The unit shown in Fig. 4 differs from that shown in Fig. 3 primarily in that the single coil $c$ of Fig. 3 is replaced in Fig. 4 by two end to end coils $c^1$ and $c^2$. The latter are similar to one another, but are arranged to be reversely connected to the energizing source of alternating current so that during every second half cycle of the alternation of energizing coils $c^1$ and $c^2$, each end of the armature D' of Fig. 4 will be a north pole, and during alternating half cycles, each end of the armature D' will be a south pole. The tubular armature D' may be exactly like the armature D in Fig. 3, but preferably, and as shown, is relatively shorter than the armature D. When the armature D' is energized by the coils $c^1$ and $c^2$ as described, each end of the armature will be alternately attracted and repelled by the adjacent pole of the permanent magnet once during each cycle of alternation of the energizing current. The arrangement shown in Fig. 4 thus provides for simultaneous push-pull drives at the two ends of the armature. Moreover, during each half cycle of alternation of the energizing current, the magnetic forces acting on the two ends of the armature tend to move the latter in the same direction.

As will be apparent, each of the units shown in Figs. 3 and 4 may be mounted in any suitable housing structure including supporting provisions for a stationary condenser plate cooperating with the plate F. Such a housing structure may be identical to that shown in Fig. 1.

While in accordance with the provision of the statutes, I have illustrated and described the best forms of embodiment of my invention now known to me, it will be apparent to those skilled in the art that changes may be made in the form of the apparatus disclosed without departing from the spirit of my invention as set forth in the appended claims, and that in some cases certain features of my invention may be used to advantage without a corresponding use of other features.

Having now described my invention, what I claim as new and desire to secure by Letters Patent, is:

1. A vibratory condenser converter mechanism comprising a rigid stationary plate and a rigid adjacent movable plate alongside the stationary plate and having its central portion in registry with the central portion of the stationary plate, a shaft having one end connected to the central portion of the movable plate and extending transversely away from the plates, a pair of flexible, shaft supporting, diaphragms transverse to said shaft and mechanically connected thereto at different distances from said movable plate, a support to which the peripheral portions of the diaphragms are secured, a tubular armature surrounding and attached to said shaft, an energizing winding surrounding said armature, conductors for connecting said winding to a source of alternating current, and permanent magnet means secured to said support in fixed position relative to the latter for cooperation with said armature and winding to move said shaft longitudinally back and forth with a frequency corresponding to the frequency of alternation of the current supplied by said source.

2. A vibratory condenser converter mechanism as specified in claim 1, in which said movable plate and the parts connected to and vibrating with that plate are proportioned and arranged to constitute a vibrating structure having a natural vibration frequency substantially different from the frequency of alternation of the alternation current energizing said winding.

3. A vibratory condenser converter mechanism as specified in claim 1, in which the diaphragm nearest the movable plate is substantially thicker and stiffer than the other diaphragm.

4. A vibratory condenser converter mechanism as specified in claim 1, in which said permanent magnet means comprises a separate permanent magnet at each side of said winding with the adjacent ends of the two permanent magnets of the same polarity, and in which the simultaneous polarities of the two ends of the armature when energized, are different.

5. A vibratory condenser converter mechanism as specified in claim 1, including a permanent magnet at one side of said winding and having pole pieces of opposite polarities cooperating with said magnet to form a magnetic flux path of low reluctance, including a relatively short air gap alongside one end of said armature.

6. A vibratory condenser converted mechanism as specified in claim 1, in which said permanent magnet comprises a body of annular form which is coaxial with said armature and has an internal diameter substantially greater than the external diameter of said armature, and comprises a pole piece of disc form interposed between said winding and body and having an internal diameter smaller than the first, and larger than the second diameter hereinbefore mentioned, and comprises a second pole piece of disc form abutting against the end of the magnet remote from said winding and formed with a central aperture and hollow hub portion coaxial with said aperture and in juxtaposed relation with the portion of the first mentioned disc immediately adjacent the aperture therein.

7. A vibratory condenser converter mechanism as specified in claim 1, in which said support comprises a metallic housing body formed with a central chamber in which said plate, shaft, diaphragms, armature and winding are mounted.

8. A vibratory condenser converter mechanism as specified in claim 7, including steel plates extending across the ends of said housing body chamber and serving as electromagnetic shields against stray electromagnetic forces.

9. A vibratory condenser converter mechanism as specified in claim 1, including a magnetic member in the form of a curved strip of steel extending around said winding for substantially more than 180°.

10. A vibrating condenser converter mechanism as specified in claim 1, in which said permanent magnetic means comprises an annular magnetic body surrounding said winding and comprises pole piece portions separable from said body and of disc form, each in abutting relation with a corresponding end of said annular body and having an internal diameter substantially smaller than the internal diameter of said body.

11. A vibrating condenser converter mechanism as specified in claim 1, in which said winding comprises two end to end annular sections, and means so connecting them to a source of alternating current that similar polarities are simultaneously given by said windings to the two ends of said armature.

12. A vibratory converter mechanism as specified in claim 1, in which said shaft is threaded, and including a hub portion attached to the diaphragm located adjacent the movable plate, said hub portion being arranged in abutting relation with the adjacent end of said armature and formed with an internally threaded opening into which said threaded shaft is screwed, and locking means associated with the end of said shaft remote from said movable plate to clamp said armature between said pair of diaphragms, whereby upon loosening of said locking means said threaded shaft may be adjusted longitudinally of said hub portion thereby to move said movable plate toward or away from said stationary plate.

FREDERICK W. SIDE.

REFERENCES CITED

The following references are of record in the file of this patent:

UNITED STATES PATENTS

| Number | Name | Date |
|---|---|---|
| Re. 20,510 | Green | Sept. 21, 1937 |
| 458,872 | Depoele | Sept. 1, 1891 |
| 1,503,987 | Demele | Aug. 5, 1924 |
| 1,678,278 | Weyandt | July 24, 1928 |
| 2,257,830 | Wolf et al. | Oct. 7, 1941 |
| 2,305,267 | Minor | Dec. 15, 1942 |
| 2,349,225 | Scherbatskoy | May 16, 1944 |
| 2,401,527 | Vance | June 4, 1946 |